United States Patent
Weissman

(10) Patent No.: US 7,219,129 B2
(45) Date of Patent: May 15, 2007

(54) MAIL PROGRAM FOR PROCESSING MULTIPLE EMAIL MESSAGES

(76) Inventor: Peter S. Weissman, 2912 Upton St., NW., Washington, DC (US) 20008

( * ) Notice: Subject to any disclaimer, the term of this patent is extended or adjusted under 35 U.S.C. 154(b) by 569 days.

(21) Appl. No.: 09/994,672

(22) Filed: Nov. 28, 2001

(65) Prior Publication Data

US 2003/0115271 A1 Jun. 19, 2003

(51) Int. Cl.
*G06F 15/16* (2006.01)
(52) U.S. Cl. .................. 709/206; 709/204; 709/205
(58) Field of Classification Search ........... 709/206, 709/204, 205
See application file for complete search history.

(56) References Cited

U.S. PATENT DOCUMENTS

| | | | |
|---|---|---|---|
| 4,773,009 A | 9/1988 | Kucera et al. ............... 364/419 |
| 5,125,075 A | 6/1992 | Goodale et al. |
| 5,247,661 A | 9/1993 | Hager et al. |
| 5,276,869 A | 1/1994 | Forrest et al. .............. 395/600 |
| 5,493,692 A | 2/1996 | Theimer et al. ........... 455/26.1 |
| 5,623,679 A | 4/1997 | Rivette et al. .............. 395/773 |
| 5,689,805 A | 11/1997 | Ayerst et al. .............. 455/33.1 |
| 5,742,763 A | 4/1998 | Jones ...................... 395/200.3 |
| 5,878,230 A | 3/1999 | Weber et al. |
| 5,887,133 A | 3/1999 | Brown et al. ............. 395/200.3 |
| 5,913,032 A | 6/1999 | Schwartz et al. ...... 395/200.43 |
| 5,917,489 A | 6/1999 | Thurlow et al. ............ 345/347 |
| 5,937,162 A | 8/1999 | Funk et al. ............. 395/200.36 |
| 5,963,941 A | 10/1999 | Hirakawa ....................... 707/5 |
| 5,990,886 A | 11/1999 | Serdy et al. ................. 345/329 |
| 6,044,395 A | 3/2000 | Costales et al. ............ 709/206 |
| 6,085,101 A | 7/2000 | Jain et al. |
| 6,201,814 B1 | 3/2001 | Greenspan |
| 6,230,186 B1 | 5/2001 | Yaker |
| 6,247,045 B1 * | 6/2001 | Shaw et al. ................. 709/207 |
| 6,256,666 B1 | 7/2001 | Singhal ...................... 709/217 |
| 6,275,848 B1 | 8/2001 | Arnold ....................... 709/206 |
| 6,282,435 B1 * | 8/2001 | Wagner et al. .............. 455/566 |
| 6,282,564 B1 | 8/2001 | Smith et al. ................ 709/206 |
| 6,311,210 B1 | 10/2001 | Foladare et al. ............ 709/206 |
| 6,327,610 B2 | 12/2001 | Uchida et al. .............. 709/206 |
| 6,327,611 B1 | 12/2001 | Everingham ................ 709/206 |
| 6,327,612 B1 | 12/2001 | Watanabe ................... 709/206 |
| 6,453,327 B1 | 9/2002 | Nielsen ...................... 707/500 |
| 6,457,879 B1 * | 10/2002 | Thurlow et al. ............ 709/206 |
| 6,463,461 B1 * | 10/2002 | Hanson et al. .............. 709/204 |
| 6,496,849 B1 | 12/2002 | Hanson et al. .............. 709/200 |
| 6,505,233 B1 | 1/2003 | Hanson et al. .............. 709/204 |
| 6,507,865 B1 | 1/2003 | Hanson et al. .............. 709/206 |
| 2002/0099777 A1 * | 7/2002 | Gupta et al. ................ 709/206 |

(Continued)

OTHER PUBLICATIONS

Eudora 5.1 Features, www.Eudora.com/email/features/index.html, © 1999, 2000, 3 pages.

(Continued)

*Primary Examiner*—Zarni Maung
*Assistant Examiner*—Nghi Tran

(57) ABSTRACT

A mail program allows a user to simultaneously process multiple email messages to separate recipients or groups of recipients. A primary email has a primary message to be sent, and a secondary email or floater message is associated with the primary email, but directed to a different set of recipients than the primary email.

19 Claims, 2 Drawing Sheets

U.S. PATENT DOCUMENTS

2002/0120869 A1* 8/2002 Engstrom .................. 713/201

OTHER PUBLICATIONS

Eudora 5.1: Word Processor Power, www.Eudora.com/email/features/wp.html, © 1999, 2000, 1 page.

Eudora 5.1: Eudora Sharing Protocol (ESP), www.Eudora.com/email/features/esp.html, © 1999, 2000, 2 pages.

Email Trivia by TriviaWare, http://dspace.dial.pipex.com/triviaware/index.htm, Jonathan Watkins, Revised Jan. 25, 1997, 3 pages.

Email Trivia by TriviaWare, http://dspace.dial.pipex.com/triviaware/explain1.htm, Jonathan Watkins, Revised Jan. 25, 1997, 2 pages.

Email Trivia by TriviaWare, http://dspace.dial.pipex.com/triviaware/answer.htm, Jonathan Watkins, Revised Jan. 25, 1997, 1 page.

Screen Shots, Microsoft Outlook Help, "Track when messages are delivered or read" and Review Tracking Results, Microsoft Outlook 2000 SR-1, © 1995-1999, 4 pages.

* cited by examiner

MAIL PROGRAM FOR PROCESSING MULTIPLE EMAIL MESSAGES

BACKGROUND OF THE INVENTION

1. Field of the Invention

The present invention relates to software programs for processing messages. More particularly, the present invention relates to a mail program for processing multiple emails.

2. Description of the Related Art

Electronic mail (or "email") is the transmission of a message over a network and has become a ubiquitous form of communication. Email is commonly processed by a mail program or a mail service which accesses mail servers in a local or remote network. A mail program (also known as a "mail client") is a software application that is installed on a user's computer or PC and can either be a stand-alone program, such as Eudora or Outlook, or built into a Web browser. A mail service, on the other hand, is a software application that is accessed on the Web by a browser, such as Yahoo. Typical mail programs and mail services include such basic features as formatting, sending, receiving and organizing email. Email can be sent, for instance, over the Internet, private intranets or LANs. As used herein, however, the phrase "mail program" refers to any system that processes email, and includes both mail clients and mail services.

Users can send mail to a single recipient or broadcast the message to multiple users. The mail is usually sent to a mail server or host computer for the mail recipient. Most email include a header with three recipient fields, namely To, Cc (carbon copy) and Bcc (blind carbon copy). When sending to multiple recipients, the sender usually places the email address for each primary recipient(s) in the To field, and the email address for any secondary or additional recipient(s) in the Cc or Bcc fields. All the recipients of an email are able to view the name and/or email address for each of the To and Cc recipients, but the name and email address for each Bcc recipient only appear to that Bcc recipient.

One limitation of current mail programs, however, is that they are only able to process a single message for a single recipient or group of recipients. In addition, if the sender wishes to send a different message to a subset of recipients of a primary message, the sender would have to first send the primary email, then locate that primary email in his/her Sent mailbox (if the user's mail program is set up to automatically place all sent email in a Sent mailbox) and forward that primary email to the subset of recipients in a separate email with the different message.

SUMMARY OF THE INVENTION

In view of the foregoing, one object of the present invention is to provide a mail program that is capable of simultaneously processing multiple messages. It is another object of the invention to provide a mail program that can process a primary message having a set of recipients and one or more secondary messages having a subset of recipients. It is yet another object of the invention to provide a mail program that can process a primary message having a set of recipients and one or more secondary messages having a different set of recipients. It is still another object of the invention to provide a mail program that can process a primary message having a set of recipients, one or more secondary messages having a subset of recipients, and one or more tertiary messages having a different set of recipients.

In accordance with these and other objects, the invention is a mail program that allows a user to simultaneously process multiple email messages to separate recipients or groups of recipients. A primary email has a primary message to be sent, and a secondary email or floater message is associated with the primary email, but directed to a different set of recipients than the primary email.

These and other objects of the invention, as well as many of the intended advantages thereof, will become more readily apparent when reference is made to the following description, taken in conjunction with the accompanying drawings.

DESCRIPTION OF THE PREFERRED EMBODIMENTS

Figure 1:
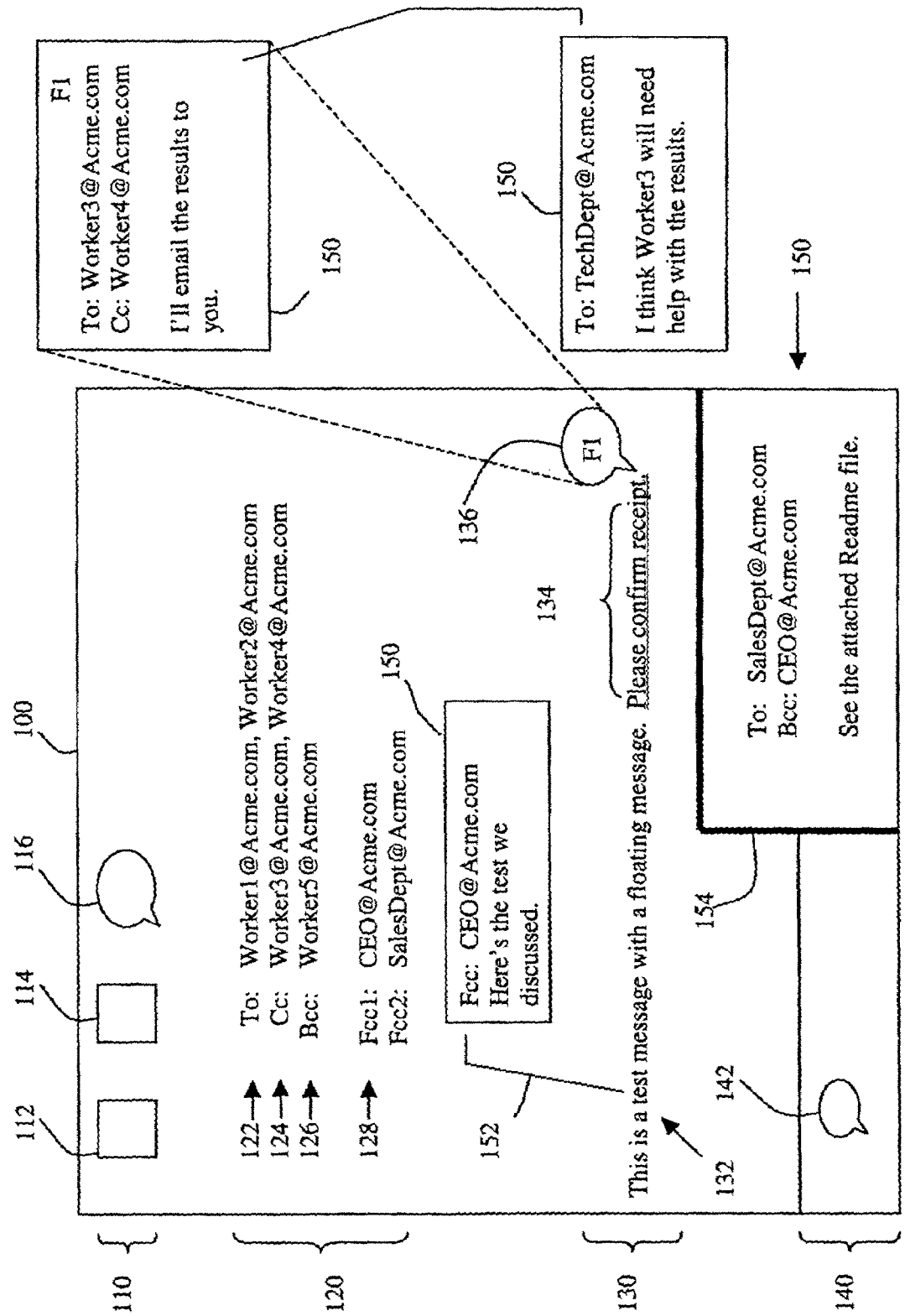
FIG. 1 shows an outgoing email in accordance with the invention.

In describing a preferred embodiment of the invention illustrated in the drawings, specific terminology will be resorted to for the sake of clarity. However, the invention is not intended to be limited to the specific terms so selected.

Turning to the drawings, FIG. 1 shows an outgoing email 100 having a primary message box 130. Various floater message boxes 150 are provided in accordance with the present invention. The email 100 has four main components: the toolbar 110, header 120, message box 130 and attachment box 140. One or more floater message boxes 150 can be associated with the email 100, as desired by the sender. Each floater message box 150 can optionally have its own toolbar, header and/or attachment boxes.

The toolbar 110 contains various command icons, such as a Send command icon 112, Bold command icon 114 and a Floater command icon 116. The commands can also be provided in a pull-down menu (not shown) that can be located across the top of the email 100 in accordance with well-known techniques. The Send command 112 is used to send the email 100, including the floater message boxes 150, to each of the various recipients listed in the header 120 and associated with the respective floater message box 150. If the user clicks on the floater command icon 116, a floater message box 150 is created.

The email header 120 includes the standard fields, To 122, Cc 124 and Bcc 126. In addition, one or more Fcc (floater carbon copy) fields 128 can optionally be provided. The user enters the email address for each of the primary recipients of the primary message 130 in the standard fields 122, 124 and 126. The Fcc field 128 allows the user to create a floater message box 150 to be sent to the recipients listed in the Fcc field 128.

The message box 130 contains the primary message 132 that is to be sent to each of the recipients listed in the standard header fields 122, 124, 126. The attachment box 140 is displayed when an attachment 142 is to be sent with the email 100.

The floater message box can be a separate box that is connected to the associated email 100 by a connector or lead line 152. The connector 152 can extend from the floater message box 150 to the recipient address in the Fcc field 128, or to a particular highlighted text 134 in the message box 130 that is associated with the floater message box 150.

Alternatively, the floater message box 150 can be incorporated into the email 100, but set off from the email 100 by a vertical, horizontal or diagonal divider 154. The divider 154 can have any size or shape, such as a small square, rectangle or cutaway that is positioned along the side, or in the corner of, the email 100. The floater message box 150 can be physically located either internal or external to the email 100. Still yet, the floater message box 150 can be in the form of an attachment 142 that is located in the attachment box 140 of the email 100.

In operation, the floater message can be created at any time during the creation of an email 100. The user selects the floater command from the pull-down menu (not shown), by clicking on the icon 116, or by entering an email address in one of the Fcc fields 128. When the floater command is selected, user options are presented, which permit the user to select the type of floater message that is desired, such as an oval callout or balloon, an appended message with a divider 154 or a box-shape with an optional connector 152. The user can drag and drop the connector 152 as desired, or eliminate the connector 152 altogether, so that the floater message box 150 would appear to the user as a separate email. Alternatively, the user need not be presented with the options 118, and instead one of the floater messages 150 can be displayed by default.

The user can also associate the floater message box 150 with specific text of the email message box 130. The user selects the desired message text 132, then selects the floater command (i.e., by entering an Fcc address, clicking on the floater icon 116, etc.). The desired text is automatically distinguished, such as by highlighting that text, as represented by the underlining of highlighted text 134. In addition, the floater message box 150 is associated with that selected text. For instance, the connector 152 extends to the highlighted text 134, or the balloon points to the highlighted text 134. Another option is to insert a designator 136 (such as F1) at the end of the highlighted text that identifies the floater message associated with that text. The associated floater message includes that same designator. The dashed lines in FIG. 1 reflect that there is an association between the designator 136 and the respective floater message 150. However, the dashed lines are not displayed to the user.

However, the manner and type of floater message boxes 150 are not to be limited to the embodiments shown, and suitable alternatives will be readily apparent to those of ordinary skill. For instance, the email 100 can include a view floater command that the user can select to view a floater message box 150. The user can then type a floater message and then identify the floater message recipient.

Once the floater message box 150 is created, the user enters a floater message in the floater message box 150 and attaches any attachments. The floater message box 150 is addressed to one or more floater recipients. The floater recipient(s) can be any of the recipient(s) of the primary message. In addition, the floater recipient(s) can be a different recipient that isn't receiving the primary message. In such instances, the floater message box 150 and email 100 are preferably switched, such that the floater recipient receives the floater message 150 as the primary email, and the email 100 forms the floater message or an attachment to the email.

Preferably, the floater message boxes 150 can include the standard email header fields of To, Cc and Bcc, as well as the Fcc field (to provide a floater message within a floater message). Accordingly, the sender can control the floating message box 150 recipients. In addition, commands (such as All, All To, All Cc, All Bcc, All Fcc, All but To, All but Cc, All but Bcc, and All but Fcc) can be provided to indicate that the floating message box 150 is to be sent to certain ones of the recipients listed in the email header 120 (such as to all of the listed recipients, all of the To recipients, all of the Cc recipients, etc., respectively). In an alternative embodiment, the Fcc field 128 can be replaced by an Fm (floating message) field that can be user-defined to specific recipients, with Fto, Fcc, Fbc fields, for instance, which would indicate that the floating message is to be sent to all the To, Cc or Bcc recipients, respectively. In addition, a field, such as Fall, could be provided such that the recipients listed in that field receive the primary message 132, and all floater messages.

In the exemplary embodiment of FIG. 1, the email 100 is directed to primary recipients Worker1@Acme.com-Worker5@Acme.com, as reflected in the standard fields 122, 124, 126. The user then enters an address, CEO@Acme.com, to a first Fcc field, Fcc1, and a second address, SalesDept@Acme.com to a second Fcc field, Fcc2. Thus, the CEO and SalesDept will not only receive the primary message 132, but also the specific floater messages 150 addressed to them. In this example, the CEO and SalesDept are listed in the Fcc field 128 for the floater message 150 shown in the bottom-right corner of the email 100. However, the recipients of floater messages need not be shown in the Fcc field 128.

In addition, the CEO receives the floater message addressed to the SalesDept since the CEO is listed as a bcc in that floater message box 150. The primary recipients, Worker1–Worker 5, only receive the primary message, but not any of the floater messages, except that Worker3 and Worker4 receive the one floater message box 150 addressed to them, and which is associated with the highlighted text 134. The recipient, TechDept receives the floater message to Worker3 and Worker 4, as well as the floater message contained within the floater message to Worker3 and Worker4.

Figure 2:
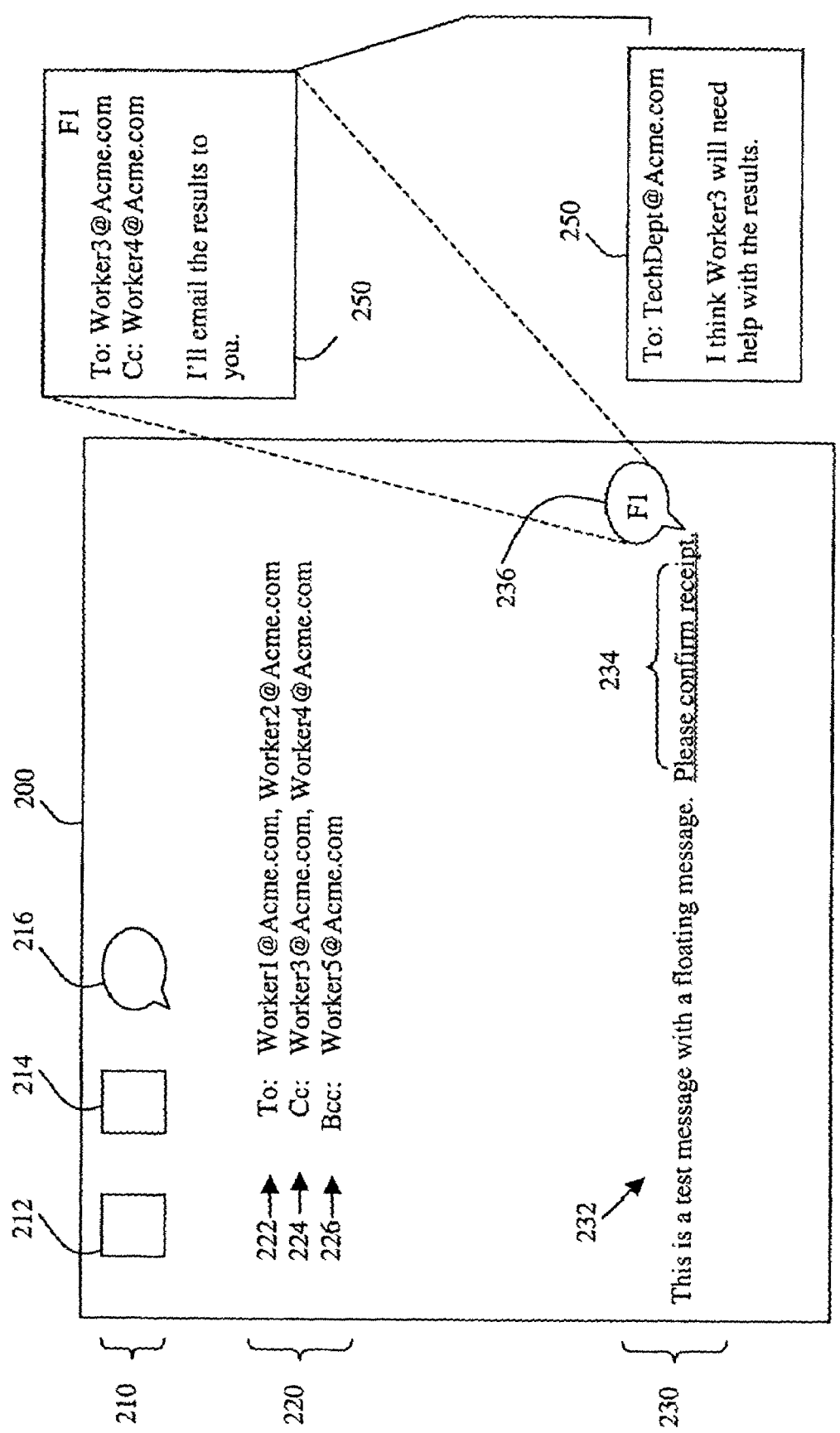
FIG. 2 shows an email received by the recipient TechDept@Acme.com of the email shown in FIG. 1 in accordance with the invention.

Turning to FIG. 2, an incoming email 200 is shown that is associated with a floater message box 250. In accordance with the example of FIG. 1, the incoming email 200 is for the TechDept recipient. The recipient sees all the recipients down the chain from the highest-order floating message. That is, the TechDept recipient sees the floating message directed to it, as well as the floating message directed to Worker3 and Worker4, and the primary email message 232. The TechDept also sees the recipients of the downstream messages, including the Bcc to the primary message, Worker5. For the option in which the floater message 250 is associated with highlighted text and/or a designator 236, the floater message 250 is preferably hidden when first received. The recipient accesses the floater message 250 by passing a mouse over the highlighted text 234, by clicking on the designator 236, or by clicking on a general Floater icon 216.

On the other hand, the recipient does not see any of the floating messages that are not in its chain. Thus, in the example of FIG. 1, the TechDept does not see the floating message to the CEO and the floating message to the SalesDept and CEO. If the sender did not wish the TechDept recipient to see the Bcc to the primary message, the sender could have removed Worker5 from the Bcc, and created a floating message to Worker5 alone. Alternatively, a separate field (for instance, a Bcc that follows the Fcc fields 120) could be created to indicate that listed recipient(s) only receive the primary message 132, and are not seen by any other recipient, including recipient(s) of any floating message.

The email 200 and floater messages 250 are preferably displayed in the manner selected by the sender of the email 100. However, the recipient's mail program also permits the recipient to set preferences on how incoming floater messages 250 are to be displayed.

The email 200, and each floater message 250, includes a Reply command 212 and Reply All command 214 that permit the recipient to respond to the sender(s). The Reply command 212 in each floater message 250 enables the user to respond to the floater message 250, in which case the original message 200 is preferably not repeated. However, the floater message 250 can also be formed as the primary message of the reply email, and the original email 100 is an attachment. The Reply All command 214 in the email 200 enables the recipient to reply to the floater message 250 and the email 200, such that the email 200 remains associated with the reply.

The email 200, and each floater message 250, further includes a Delete command (not shown) that permits the recipient to delete the respective message. Thus, the recipient can delete a floating message 250, and retain the primary email 200. Or, the recipient can delete the primary email 200, and retain the floating message 250. The primary email 200 also has a main delete command that allows the recipient to delete both the primary email 200 and floater message 250 at the same time.

When a floater message 150 is created and the email 100 is sent, the mail program preferably sends the floater message 150 as part of a single message with email 100. That is, for the example of FIG. 1, the mail program transmits eight (8) mail messages: the primary email to each of Worker1–Worker5, with Worker3 and Worker 4 receiving the additional floater message 150; the CEO receives the primary message 130 and two floater messages 150; the SalesDept receives the primary message 130 and one floater message 150; and, the TechDept receives the primary message 130 and two floater messages 150.

Accordingly, each recipient only receives a single email message, some of which also include a floater message. However, the email 100 and floater messages 150 can be transmitted in any suitable manner, such as separate emails that are linked together by the recipient's mail program. In sending the email 100, the mail program preferably first determines all of the various recipients, then cycles through each recipient and identifies the floater message(s), if any, to be sent to each recipient. The mail program then sends a single email to each recipient.

Once the email 100 is sent, the email 100 appears in the sender's Sent mailbox with a special designator indicating that a floater message 150 was attached to the email 100. Similarly, when an email 100 is still being created and appears in the user's Draft mailbox, that email 100 can appear as a special designator, such as a balloon icon, in the Draft mailbox, to indicate that the email 100 has a floater message 150. Likewise, when a recipient receives an email 200 that contains a floater message 250 for that recipient, the email 200 is designated by a special icon in the recipient's Inbox to indicate that the email 200 contains the floater message 250.

Though the floater message box 150 has been described as being particularly advantageous when there are multiple recipients to an email 100, it can also be used where there is a single email recipient. The floater message 150 can be used by the sender to make remarks about the primary message 132 that the sender doesn't want to put directly in the primary message 132. Thus, for instance, the sender may wish to submit a primary message (such as a draft letter to a third party, a paper or publication being co-authored by the sender and recipient, etc.) to a recipient, and use the floater box 150 to make reference to different points of the primary message without marking the primary message.

As another example, the email 100 can be a Reply or Forward email, and the primary message 132 can be the text of the original message. The sender can use the floater message boxes 150 to make remarks about the original message without disturbing the original message. In this regard, floater messages can also be used in a newsgroup or threaded messages, or one of the recipients of the email 100 can be a newsgroup.

The floater message boxes 150, 250 can have any suitable size or shape, and can be presented in any manner to distinguish it from the primary message, such as, for example, by change in color, an audible indicator, location (internal or external to the email 100, 200), and/or pop-up when the user passes the cursor over highlighted text or selects the floating message icon. In addition, the floater messages 150, 250 need not be presented in boxes, but can be incorporated into the text 132 of the email 100. Thus, for instance, the sender can designate certain text 132 to be seen by different recipients of an email 100.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

I claim:

1. An email system comprising:
   a first email created by a sender, the first email having a first message with at least one primary recipient; and,
   a second email created by the sender as the sender creates the first email, the second email having a second message with at least one secondary recipient, the second message different from the first message, wherein the second email is separate from and associated with the first email and processed substantially simultaneously with the first email.

2. The email system of claim 1, wherein said second email is attach to said first email.

3. The email system of claim 2, wherein the secondary window is sent to, but not displayed to, the primary recipient.

4. The email system of claim 1, wherein the at least one secondary recipient(s) are the same as the at least one primary recipient(s).

5. The email system of claim 1, further comprising a plurality of primary recipients, wherein the at least one secondary recipient is one of the plurality of primary recipients.

6. The email system of claim 1, wherein the first message and second message are substantially simultaneosly received the computer program for one of the primary recipient and the secondary recipient.

7. The email system of claim 1, wherein the first email and the second email are transmitted to each of the at least one primary recipient and the at least one secondary recipient as a single electronic mail.

8. The email system of claim 1, further comprising a primary tab associated with first message and a secondary tab associated with the second message, wherein the primary tab and secondary tab selectively display the first message and the second message, respectively.

9. The email system of claim 1, wherein at least one of the at least one primary recipient receives the first message, but not the second message.

10. The email system of claim 1, wherein said email system comprises a mail service.

11. The email system of claim 1, wherein said first email has a first address field identifying the at least one primary recipient and said second email has a second address field identifying the at least one secondary recipient.

12. An electronic mail message comprising:
a primary window created by a sender, the primary window having a primary message with at least one primary recipient; and,
second window created by the sender as the sender creates the primary window, the secondary window having a secondary message with at least one secondary recipient, the secondary message different from the primary message, wherein the secondary window is separate from and associated with the primary window and processed substantially simultaneously with the primary window.

13. The electronic mail message of claim 12, wherein each of the at least one recipient(s) are different than the at least one primary recipient(s).

14. The electronic mail message of claim 12, further comprising a primary tab associated with the primary window and a secondary tab associated with the secondary window, wherein the primary tab and the secondary tab selectively display of the primary window and secondary window, respectively.

15. A computer software application embedded in a computer-readable storage medium, the computer program having instructions that, when executed by a processor, cause the processor to execute the steps comprising the steps of:
processing a primary email created by a sender, the primary email having at least one primary recipient; and,
processing a secondary email created by the sender as the sender creates the primary email, the secondary email having at least one secondary recipient, the second message different from the first message, wherein the secondary email is associated with the primary email and processed substantially simultaneously with the processing of the primary email.

16. The computer software application of claim 15, wherein each of the at least one secondary recipient(s) are different than the at least one primary recipient.

17. The computer software application of claim 15, wherein said processing the primary email comprises generating the primary email and said processing the secondary email comprises generating the secondary email.

18. The computer software application of claim 15, wherein said processing the primary email comprises receiving the primary email and said processing the secondary email comprises receiving the secondary email.

19. The computer software application of claim 15, wherein said processing the primary email comprises transmitting the primary email to the at least one primary recipient, and said processing the secondary email comprises transmitting the secondary email to the at least one secondary recipient.

* * * * *